US008099525B2

(12) United States Patent
Nicholson et al.

(10) Patent No.: US 8,099,525 B2
(45) Date of Patent: Jan. 17, 2012

(54) METHOD AND APPARATUS FOR CONTROLLING ACCESS TO LOGICAL UNITS

(75) Inventors: Robert Bruce Nicholson, Southsea (GB); Nicholas Michael O'Rourke, Southhampton (GB)

(73) Assignee: International Business Machines Corporation, Armonk, NY (US)

( * ) Notice: Subject to any disclaimer, the term of this patent is extended or adjusted under 35 U.S.C. 154(b) by 662 days.

(21) Appl. No.: 10/597,363

(22) PCT Filed: Dec. 2, 2004

(86) PCT No.: PCT/EP2004/053237
§ 371 (c)(1),
(2), (4) Date: Jul. 25, 2008

(87) PCT Pub. No.: WO2005/076120
PCT Pub. Date: Aug. 18, 2005

(65) Prior Publication Data
US 2008/0281993 A1  Nov. 13, 2008

(30) Foreign Application Priority Data

Jan. 21, 2004  (GB) .................................. 0401246.4

(51) Int. Cl.
*G06F 3/00* (2006.01)
*G06F 13/00* (2006.01)
(52) U.S. Cl. .......................................... 710/14; 711/152
(58) Field of Classification Search .................. None
See application file for complete search history.

(56) References Cited

U.S. PATENT DOCUMENTS

| 6,647,387 | B1 | 11/2003 | McKean et al. ................. 707/9 |
| 2003/0014600 | A1* | 1/2003 | Ito et al. ....................... 711/152 |
| 2003/0189936 | A1 | 10/2003 | Terrell et al. ............. 370/395.31 |
| 2004/0268069 | A1* | 12/2004 | Satoyama et al. ............. 711/162 |
| 2005/0005064 | A1* | 1/2005 | Ito et al. ....................... 711/114 |
| 2005/0204104 | A1* | 9/2005 | Aoshima et al. ............. 711/161 |
| 2007/0016681 | A1* | 1/2007 | Suzuki et al. ................ 709/227 |

FOREIGN PATENT DOCUMENTS

EP  1276034 A2  1/2003

* cited by examiner

*Primary Examiner* — Henry Tsai
*Assistant Examiner* — Titus Wong
(74) *Attorney, Agent, or Firm* — Harrington & Smith (57) ABSTRACT

A method and apparatus are provided for controlling access to logical units, a logical unit being an addressable entity that accept commands. A plurality of logical units are accessible by one or more ports, a port being an addressable entity that sends commands. A communication means which may be a storage area network (SAN) (102, 202) provides access to the plurality of logical units by the one or more ports. One or more ports that require access to the same logical units are grouped in a named set (301, 302, 303) in a first location. The named set (301, 302, 303) is associated (300) in a subsequent location with selected logical units (304) thereby controlling the access to the logical units. Identification information for the ports in a named set is extracted at the subsequent location by referencing the named set. The sets can be physically defined, for example, by switch zoning, or logically defined by logically grouping port names.

29 Claims, 5 Drawing Sheets

METHOD AND APPARATUS FOR CONTROLLING ACCESS TO LOGICAL UNITS

TECHNICAL FIELD

This invention relates to the field of computer systems in which logical units which are addressable entities which accept commands are accessed by one or more ports which are addressable entities which issue commands. In particular, the invention can relate to storage area networks (SANs) and controlling access to logical units of data storage.

BACKGROUND ART

The invention is described herein in the context of storage systems in a storage area network with access to storage by host computers being controlled. However, the invention can be applied in non-storage architectures which involve communication between entities in a computer system via a network, for example, between a computer and a printer. Also, the invention can be applied in storage architectures with communication between two storage controllers.

DISCLOSURE OF INVENTION

The development of distributed computer systems with client/server architectures has created problems in controlling access to peripherals attached in a distributed computer system by other entities in the computer system.

A storage area network (SAN) is a network whose primary purpose is the transfer of data between computer systems and storage elements. In a SAN, storage devices are centralised and interconnected. A SAN is a high-speed network that allows the establishment of direct communications between storage devices and host computers within the distance supported by the communication infrastructure. A SAN can be shared between servers and/or dedicated to one server. It can be local, or can be extended over geographical distances.

SANs enable storage to be externalised from the servers and centralised elsewhere. This allows data to be shared among multiple servers. Data sharing enables access of common data for processing by multiple computer platforms or servers.

The host server infrastructure of a SAN can include a mixture of server platforms. The storage infrastructure includes storage devices which are attached directly to the SAN network. SANs can interconnect storage interfaces together into many network configurations.

The Fibre Channel (FC) interface is a serial interface which is the primary interface architecture for most SANs. However, other interfaces can also be used, for example the Ethernet interface can be used for an Ethernet-based network.

SANs are generally implemented using Small Computer Systems Interface (SCSI) protocol running over a FC physical layer. However, other protocols may be used, for example, TCP/IP protocols are used in an Ethernet-based network.

A Fibre Channel SAN uses a fabric to connect devices. A fabric is the term used to describe the infrastructure connecting servers and storage devices using interconnect entities such as switches, directors, hubs and gateways. The different types of interconnect entities allow networks of varying scale to be built. Fibre Channel based networks support three types of topologies, which are point-to-point, arbitrated loop, and switched. These can be stand alone or interconnected to form a fabric.

All entities in a Fibre Channel fabric have a unique identity that is assigned to that entity. Fibre Channel fabrics include a range of different types of ports and there is an addressing system used to address the ports in the fabric. Each port in the fabric has its own unique address called a World Wide Port Name (WWPN). Each node in the fabric such as a host bus adapter or storage device also has its own unique address called a World Wide Node Name (WWNN). These identities are referred to within this document as port or node identities.

Zoning allows for finer segmentation of a fabric. Zoning can be used to instigate a barrier between different environments. Only members of the same zone can communicate within that zone.

Within a fabric of a SAN, management of access to data storage areas by host computers is required. Each storage device or peripheral is managed by a storage controller. To manage access to storage areas in a storage device, a storage controller typically maintains a map that identifies each respective host computer's access privileges to each storage area. Every time that a host is added or removed from the SAN, each storage controller to which the host is connected is required to modify its mapping to either add or remove the host and its associated storage area access to or from the map. Such complex map maintenance requires a high performance overhead.

Within each storage device there may be hundreds of storage volumes or logical units (LU). Each partition in the storage device has its own logical unit number (LUN). A storage controller allows or disallows access to a LUN in response to requests from different host computers.

The term "logical unit" is used throughout this document with a broad definition to refer to any entity in a computer system which is addressable and which accepts commands. The logical unit may be associated with an area of data storage, however, this is not a prerequisite. A logical unit may be in a storage device, a storage controller, other forms of computer peripheral, etc. The term is well recognised in SCSI protocol but its use in this document is in a broader sense as well as applying to the SCSI protocol.

Similarly, the term "port" is used to define any entity in a computer system which is addressable and which issues commands. A port can be a port of a host computer, a storage controller, or any other device which can send commands to access a logical unit as defined above.

SAN storage logical unit mappings are typically done on a port or node identifier (WWPN/WWNN) to logical unit number (LUN) basis. This creates a configuration overhead as adding a new mapping relationship to the SAN requires not only setting up of the switch port zoning to include the new physical/logical connection relationship, but also the new mapping relationship must be configured on the storage device.

On most storage devices when setting up a mapping, a list of World Wide Port Names (WWPN) are presented to the user and a port name must be chosen from the list. Since port names are normally 32 hex characters long this can be a very difficult task as the user must already know which host port has the WWPN to which he wishes to map logical units. Also, when setting up mappings to multiple WWPNs this process must be repeated again and again, with a greater possibility of making mistakes. Other issues arise when physical changes in the SAN change the WWPNs or WWNNs of host adapters due to failures or changes of configuration.

In Fibre Channel, a switch is provided to manage host computer access to storage controllers. However, this does not manage access to the storage areas within the storage devices controlled by the storage controllers. Configuration of the FC switch is known as switch port zoning in which a port/host computer mapping table is created and maintained to manage access by host computers to storage controllers. Switch SAN management procedures map a set of predetermined ports in a storage controller that are available to a set of predetermined host computers. Using the mapping table, the switch SAN management procedure will only allow host computer access to a storage controller that is configured with one or more ports.

Multiple host servers may need access to the same logical units on a storage system. This occurs when they are running distributed SAN applications, n-way SAN file systems or parallel access databases. Multiple storage controllers can also provide LUNs to the same system, for example in the IBM Total Storage SAN Volume Controller.

It is an aim of the present invention to remove the need for manual assigning of host computer port identifies to logical units in a storage area network. However, the invention goes further in that the proposed method provides a means of creating a relationship between a set of ports and selected logical units wherein the relationship controls access to the logical units.

According to a first aspect of the present invention there is provided a method for controlling access to logical units, a logical unit being an addressable entity that accepts commands, wherein a plurality of logical units are accessible by one or more ports, a port being an addressable entity that sends commands, the method comprising: grouping together as a named set in a first location one or more ports that require access to the same logical units; associating in a subsequent location a named set with selected logical units; and extracting at the subsequent location identification information for the one or more ports by referencing the name of the named set.

In one embodiment, the logical units may be in a storage device and the access may be via a storage area network. The storage area network may use the SCSI protocol and may use a Fibre Channel interface. However, other forms of storage area network may be used for example and Ethernet-based network. Logical units may be in other forms of non-storage device, for example, peripheral devices such as printers or diagnostic or performance testing devices. The logical units may be identified by logical unit numbers.

The step of grouping together one or more ports may be carried out by physically connecting the ports together as a named set and providing a locating address for the named set. Alternatively, the ports may be grouped by logically identifying the ports in a set.

The method may include the step of associating in a plurality of subsequent locations. In this way, a named set can be defined once and referenced by its name from subsequent locations.

The identification information for the ports in the association of the named set with the selected logical units may be dynamically changed in response to changes in the port configurations.

According to a second aspect of the present invention there is provided an apparatus for controlling access to logical units, comprising: a plurality of logical units, a logical unit being an addressable entity that accept commands; one or more ports, a port being an addressable entity that sends commands; a communication means providing access to the plurality of logical units by the one or more ports; a means at a first location for grouping the one or more ports that require access to the same logical units in a named set; a controlling means at a subsequent location for controlling access to the logical units by associating a named set with selected logical units; and an extracting means at the subsequent location for extracting identification information for the one or more ports by referencing the name of the named set.

In one embodiment, the logical units may be in a storage device and the communication means may be a storage area network. The storage area network may use the SCSI protocol and may use a Fibre Channel interface. However, other forms of storage area network may be used for example and Ethernet-based network. Logical units may be in other forms of non-storage device, for example, peripheral devices such as printers or diagnostic or performance testing devices. The logical units may be identified by logical unit numbers.

The means for grouping the one or more ports may physically connect the ports together as a named set and may provide a locating address for the named set. For example, the means for grouping the one or more ports may be a Fibre Channel switch in a storage area network. Alternatively, the means for grouping the one or more ports may logically connect the ports by port identification information.

There may be provided a plurality of subsequent locations. In this way, a named set can be defined once and referenced by its name from subsequent locations.

The means for associating the identification information with the selected logical units may include a service means for changing the identification information in response to changes in the port configurations. The service means may keep the controlling means in step with changes in the set configurations so that events can trigger a rediscovery of the ports in a set. In this way, changes to the association relationships may be automatic when new ports are added, failures occur, etc.

The controlling means may be a storage controller. Alternatively, the controlling means may be an independent software agent.

In one embodiment, the controlling means may create associations using existing sets in the form of switch zones. Logical unit mappings are setup using the switch/fabric name and zone name. The controlling means may then, using suitable tools, extract the port identification information from the switch and set up mappings for all the ports in that zone.

A storage controller may act as back up storage by associating all ports of the storage controller in all named sets and selecting which named set the logical units are associated with.

According to a third aspect of the present invention there is provided a computer program product stored on a computer readable storage medium comprising computer readable program code means for controlling access to logical units, a logical unit being an addressable entity that accepts commands, wherein a plurality of logical units are accessible via a network by one or more ports, a port being an addressable entity that sends commands, the code means performing the steps of: grouping together as a named set in a first location one or more ports that require access to the same logical units; associating in a subsequent location a named set with selected logical units; and extracting at the subsequent location identification information for the one or more ports by referencing the name of the named set.

BRIEF DESCRIPTION OF THE DRAWINGS

Embodiments of the present invention will now be described, by way of examples only, with reference to the accompanying drawings in which.

BEST MODE FOR CARRYING OUT THE INVENTION

The embodiments described herein are provided in the context of storage area networks (SAN) in which at least one host computer is connected to one or more storage devices via a SAN. However, the invention can also be applied to other arrangements of computer systems. The invention relates to controlling access to logical units by ports in a computer system. The access can be via any form of network or by direct access and can include access between storage controllers, between a peripheral device and a computer, between management and diagnostic devices and other forms of arrangement.

Figure 1:
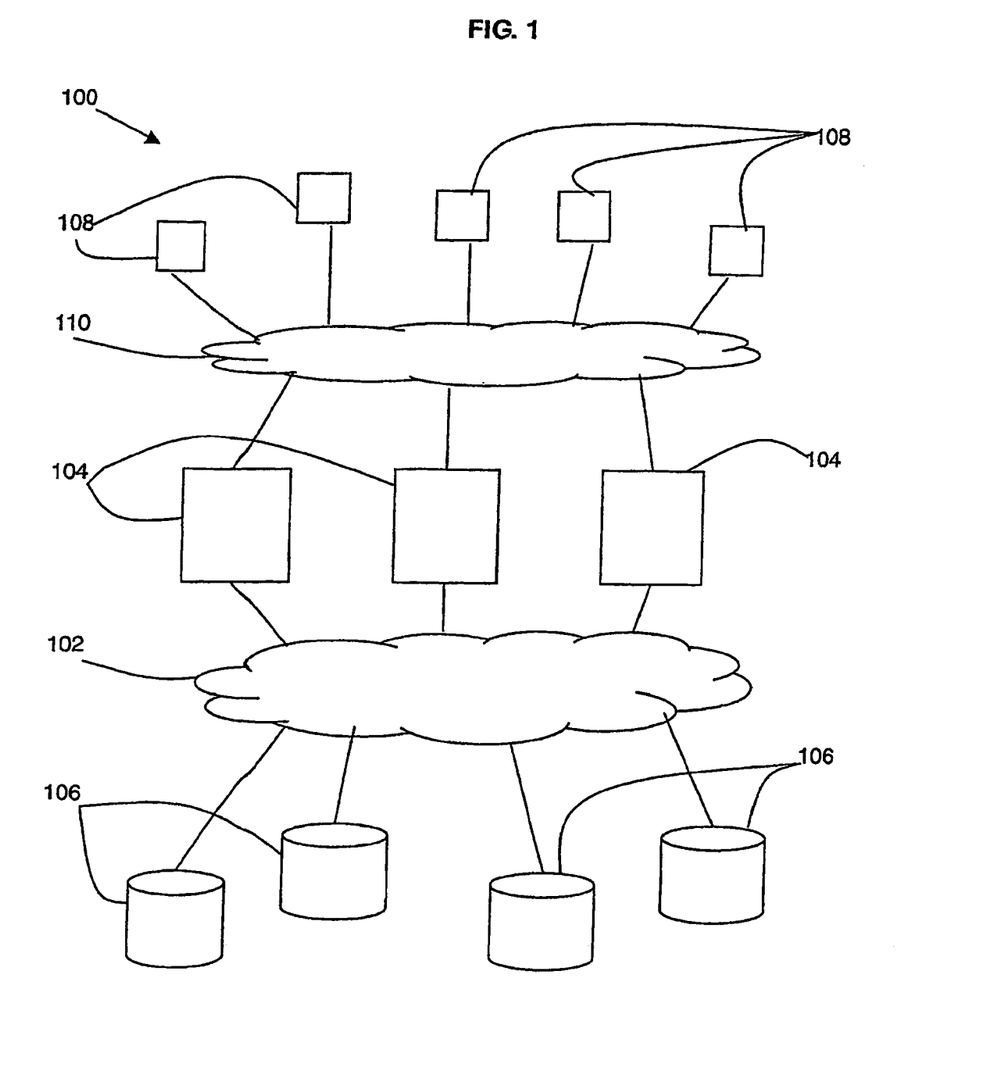
FIG. 1 is a block diagram of a computer system that shows an exemplary storage area network (SAN) in accordance with the present invention.

Referring to FIG. 1, a computer system 100 is shown including a storage area network (SAN) 102 connecting multiple servers or host computers 104 to multiple storage systems 106. Multiple client computers 108 can be connected to the host computers 104 via a computer network 110.

Distributed client/server computing is carried out with communication between clients 108 and host computers 104 via a computer network 110. The computer network 110 can be in the form of a Local Area Network (LAN), a Wide Area Network (WAN) and can be, for example, via the Internet. In this way, clients 108 and host computers 104 can be geographically distributed. The host computers 104 connected to a SAN 102 can include a mixture of server platforms.

A SAN 102 is a storage network that interconnects distributed host computers 104 and storage systems 106 such that direct communication can be made within the distance supported by the SAN infrastructure. The SAN interface infrastructure may be the Fibre Channel (FC) interface or another form of interface such as the Ethernet interface. The embodiments described herein use the Fibre Channel interface.

A SAN 102 using the Fibre Channel interface provides an infrastructure to connect host computers 104 to storage systems 106. The infrastructure uses interconnect entities such as switches, directors, hubs and gateways. The different types of interconnect entities allow SANs of varying scale to be built. In this described embodiment, the SAN 102 is implemented using the SCSI protocol running over the Fibre Channel physical layer.

A switch is a device in a Fibre Channel SAN for interconnecting large numbers of devices. When a switch is implemented in a SAN 102, the network is referred to as a fabric or switched fabric. Each device connected to a port on the switch can potentially access any other device connected to any other port on the switch enabling on-demand connection to every connected device. Multiple switches can be used and can be cascaded for expanded access. As switches allow any-to-any connections, the switch and management software can restrict the other ports to which a specific port can connect to. This is called switch port zoning.

The storage systems 106 can include various different forms such as shared storage arrays, tape libraries, disk storage all referred to generally as storage devices. Within each storage device there may be hundreds of storage volumes or logical units (LU). Each partition in the storage device has its own logical unit number (LUN). A logical unit is this context is a storage entity which is addressable and which accepts commands. However, the term "logical unit" is applied generally to other entities which may or may not be storage entities which are addressable and which accept commands. For example, a printer may have logical units used for printing directly without storing data.

Management or control of access to logical units by other entities described generally as ports is required. In this embodiment, control of access to data storage areas by host computers is required. Each storage device or peripheral is managed by a storage controller which may be integral to a storage device or may be separate. A storage controller allows or disallows access to a logical unit in response to requests from different host computers. A single storage controller may control more than one storage device.

In the described method and apparatus, multiple ports which require access to the same logical units are grouped together in named sets. The grouping of ports can be achieved physically or logically. The ports in a set can include ports of different forms of devices which have in common the need to access the same logical units.

In one embodiment, a switch port zoning using a Fibre Channel switch in a SAN is used to group together in sets in the form of zones all host computer ports which require access to the same logical units of storage. In another embodiment, ports can be grouped in sets using their unique port names (e.g. WWPNs) to logically define a set. Sets are named to enable the set to be distinguished from other sets. If there are multiple switches, for example, the zone will be named and the switch will also be named in order to provide an address for the zone.

In addition to grouping multiple ports together, the described method and apparatus provide an association of the named set to selected logical units. In this way, the ports within a set can be changed without affecting the association of the set with the logical units.

A software agent is provided which defines the association between sets and the logical units. In one embodiment, the agent can be provided in a controller of the logical units. In another embodiment, the agent can be off-board and issues commands to the controller of the logical units. The agent can pull information regarding the sets from the relevant physical or logical source of the sets. An exception mechanism in the agent can be provided driven by the source of the sets to keep up to date with changes in the sets.

In the described embodiment of the SAN, switch zones are set up to group together ports of host computers which require access to the same logical units of a storage device. A storage controller has a mapping table for associating the zones with selected logical units using the logical unit numbers. The mapping identifies the switch/fabric name and the zone name.

The storage controller, using suitable tools, can extract the port identities in the form of WWPNs from the switch and the storage controller can set up mappings for all the identities in the zone to the LUNs.

The following example is used to illustrate the described method and apparatus.

Figure 2:
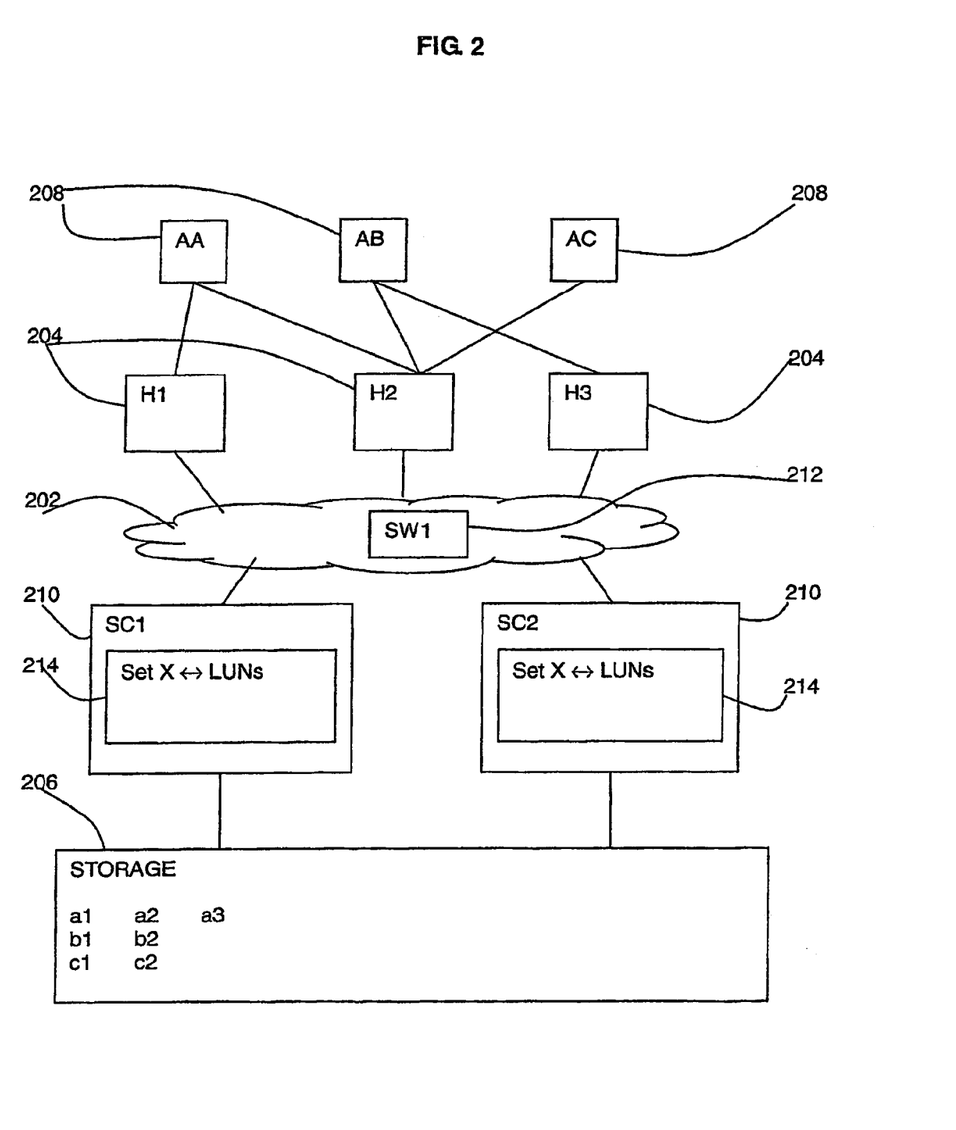
FIG. 2 is a block diagram of a storage area network (SAN) in accordance with an embodiment of the present invention.

Referring to FIG. 2, a plurality of host computers 204 are shown in the form of Hosts 1, 2, and 3 (H1, H2, H3). Multiple applications 208 (AA, AB, AC) run on one or more of the host computers 204.

A SAN 202 is provided connecting the host computers 204 to storage devices 206. The SAN 202 is a Fibre Channel SAN 202 and includes at least one switch 212 (SW1).

The storage devices 206 have storage controllers 210 (SC1, SC2). One storage controller 210 (SC1) provides main storage for all applications 208. The second storage controller 210 (SC2) in this example provides back up storage for all applications 208 but not all at one time.

Application AA requires access to logical storage areas a1, a2 and a3 in the storage devices 206. Application AB requires access to logical storage areas b1, b2 and application AC requires access to logical storage areas c1, c2.

A switch 212 sets up switch zoning grouping together ports of host computers 204 which require access to the same logical units in the storage devices 206. In this example the following zones are set up:

Zone A is set up for all host computer ports that run the application AA, namely ports on H1 and H2;

Zone B is set up for all host computer ports that run the application AB, namely ports on H2 and H3; and Zone C is set up for all host computer ports that run the application AC, namely a port on H2.

The described method provides a system which associates a group of logical units in the storage devices 206 with a switch zone, and hence all the ports within that zone at a given time.

A mapping table 214 is provided in the storage controllers 210 which maps an existing zone set up in a switch 212 to LUNs in the storage devices 206. The mapping table 214 could be provided separately to the storage controllers 210 with hooks in the storage controllers 210 to communicate with the off-board software agent providing the mapping table 214.

The mapping table 214 can include a user interface which can identify the zones and the associated logical units. In addition, the user interface can optionally identify the port identifiers included in a zone at any time.

In this example, Zone A is mapped to LUNs a1, a2 and a3, zone B is mapped to LUNs b1 and b2, and Zone C is mapped to LUNs c1, c2.

This allows groups of host computers 204 that all need to "see" the same logical storage to run a particular application, particularly a distributed one, to be configured with a single simple relationship. This relationship can easily be changed such that the connectivity provided by the change to switch zoning exactly matches with the logical units. This gives the effect of associating the logical units with the location of the application that needs them.

Figure 3:
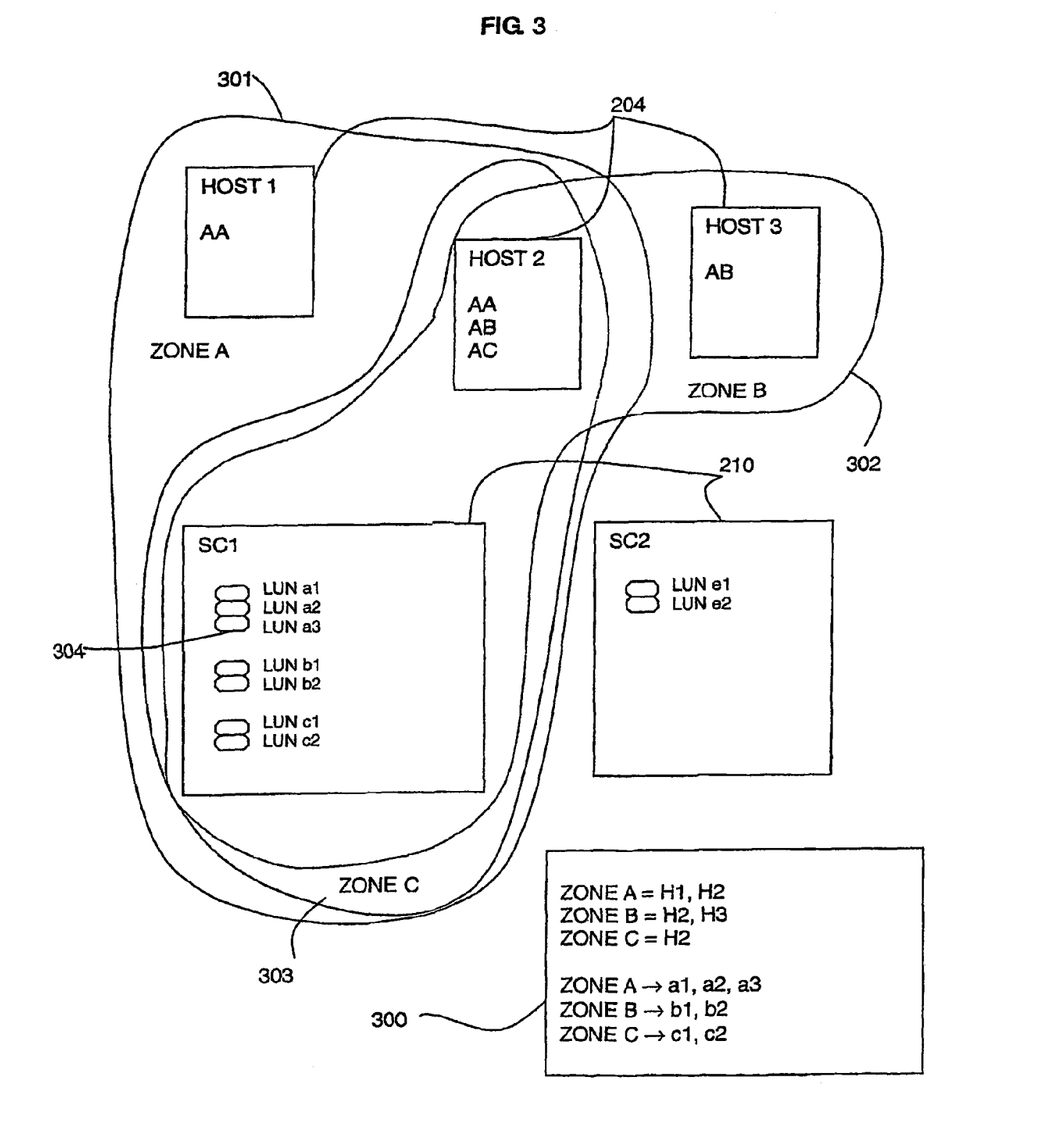
FIG. 3 is a schematic diagram showing access zones in the storage area network (SAN) of FIG. 2.

The zones 301, 302, 303 of this example are illustrated schematically in FIG. 3. FIG. 3 also shows the association 300 of the zones 301, 302, 303 with the logical units 304.

This method also gives an added flexibility when a storage device 206 is used by many applications for backup, data mining or copy services like flash copy.

In FIG. 3, the second storage controller (SC2) with logical units e1, e2 might be used as temporary storage for the purposes of backup or data mining etc. This storage controller could have its logical unit to zone relationship modified at any time such that the storage it presents is available to the host computer that is running the application that requires the additional temporarily storage. Assuming the ports of the second storage controller are already members of the 3 existing zones, so are physically accessible. By changing which zone the logical units are associated with, the logical units on the second controller (SC2) would be visible to the correct host computer at the correct time, without changing the switch zoning definitions.

For example, to allow the storage on SC2 to be used by host 3, a relationship would be created for the logical units e1, e2 and Zone B. These logical units would then be accessible by host 3 only. When host 2 then requires the temporary storage the zone name would be changed to Zone C.

Moving or running another instance of an application on a new or existing host is as easy as adding the ports of that host to the correct switch zone. For example, if there is another host "Host 3" and another instance of application AC is to be run on it, the new host is plugged into the switch and its ports are added to Zone C. The storage controller knows this has occurred and will automatically provide access to the logical units that are required for application AC. No storage controller configuration activity is required.

As the groups of switch ones could contain the same host port and have a different set of logical units mapped to them, the logical unit numbers of the whole system must be coordinated to prevent any clashes.

In existing systems, typically a list of logical units will start at logical unit number 0 and increment, with a specific non-overlapped set of host ports being able to see those logical units. In the described method, a logical unit can be set up to have one logical unit number. Therefore, the logical unit to logical unit number relationship in the storage controller is simplified as it is no longer a 1-to-many relationship. This means that host computers' operating systems attached to the storage controller must be capable of dealing with lists of logical units that are non-consecutive.

Figure 4:
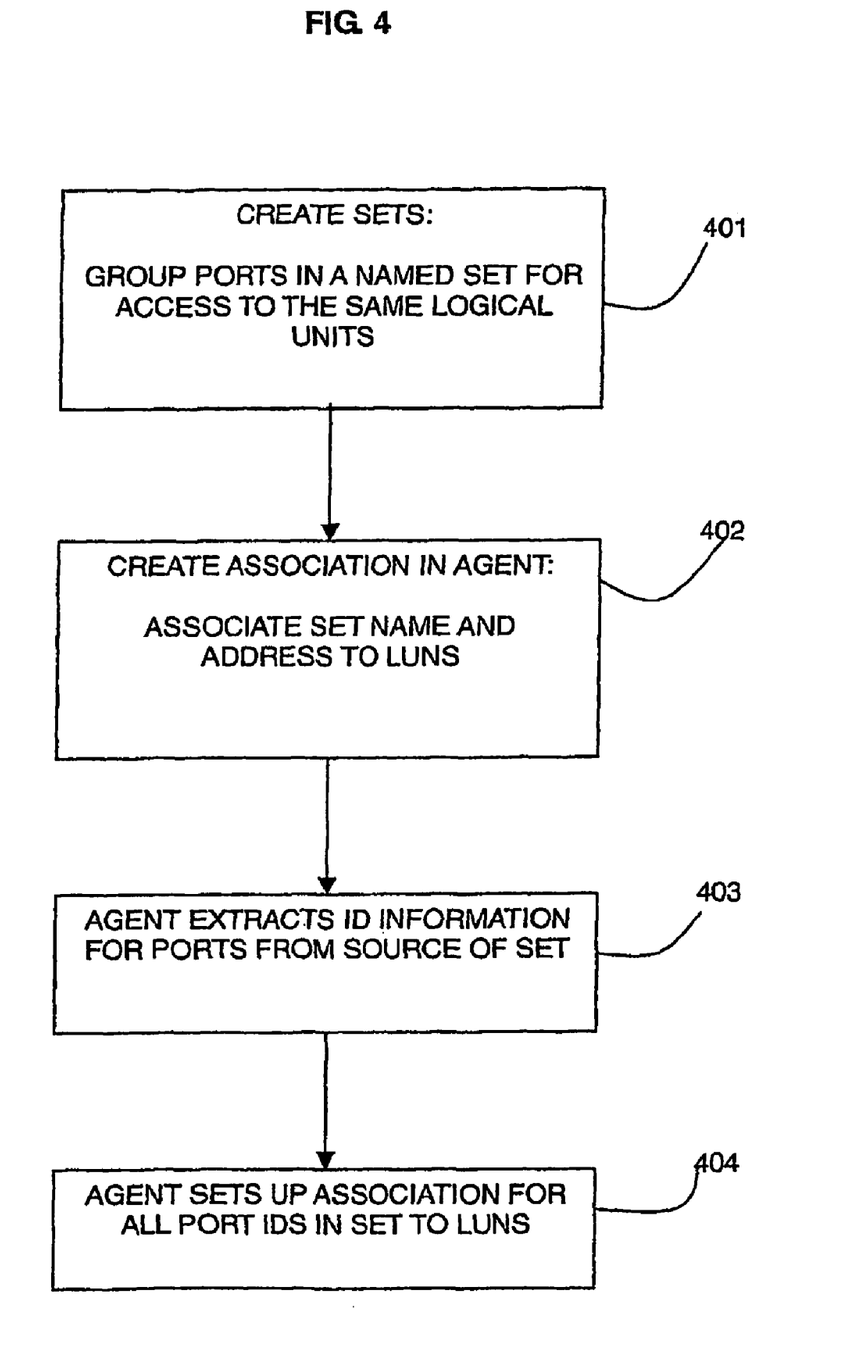
FIG. 4 is a flow diagram showing a method of creating associations in accordance with the present invention.

Referring to FIG. 4, a flow diagram is provided showing the described method of creating associations for controlling access by ports to logical units. In the first step 401 of FIG. 4, sets of ports that require access to the same logical units are grouped together. The grouping can be physical, for example, by switch zoning, or it can be logical by port identifiers. In any case, there is a source of sets from which information regarding the ports in a set can be obtained.

In the next step 402 of FIG. 4, an association is created in a software agent between a set name and selected logical units. The set name and address, if required, are provided and associated with the logical unit numbers.

In the third step 403, the software agent extracts the port identification information from the source of the set.

In the fourth step 404, the software agent sets up an association for all port identifiers in a set to the logical unit numbers to which the set is allowed access.

Figure 5:
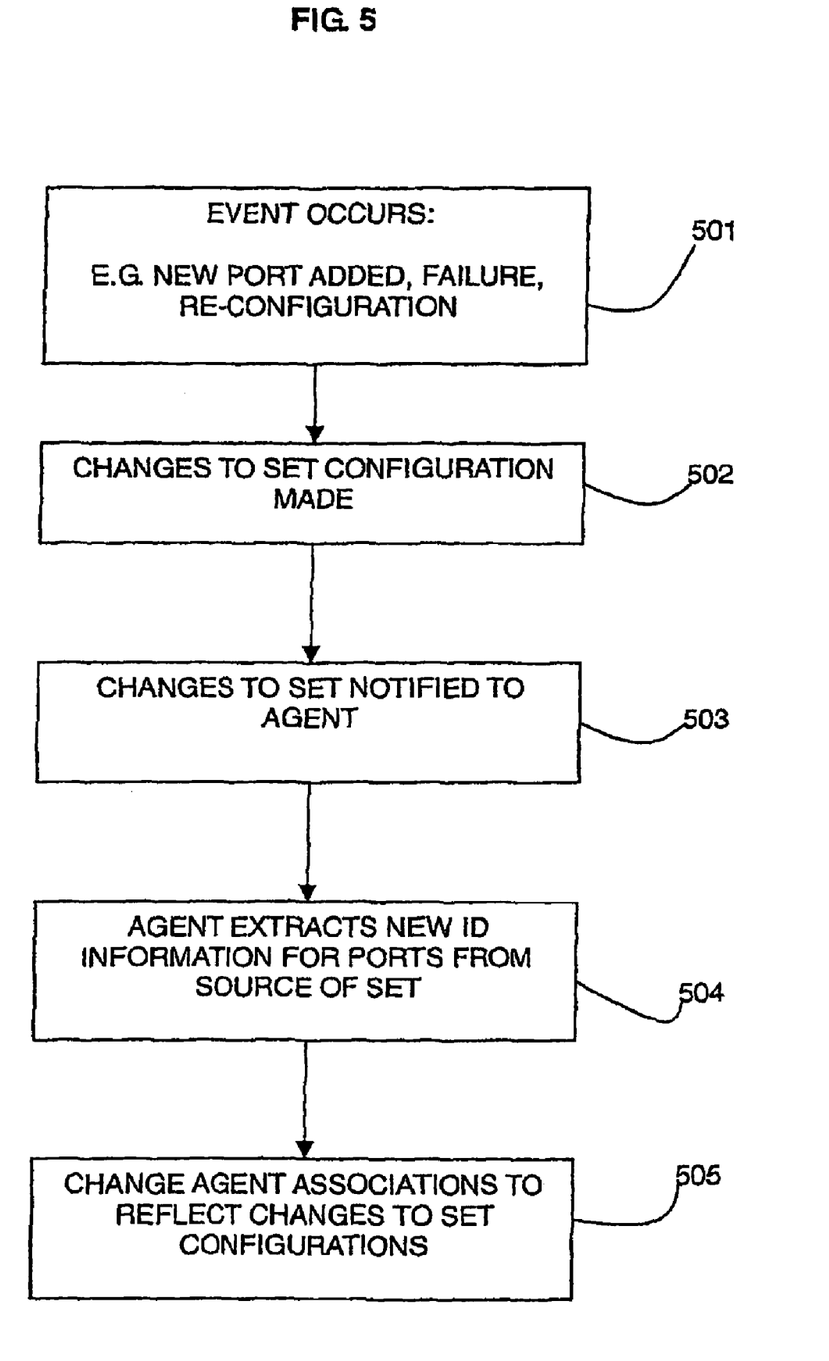
FIG. 5 is a flow diagram showing a method of updating associations in accordance with the present invention.

Referring to FIG. 5, a flow diagram is provided showing the described method of updating associations for controlling access in response to changes in configurations of the ports. At the first step 501, an event occurs that affects the configuration of the ports in a set. At the second step 502, changes are made to the set configuration at the source of the set. For example, a switch configuration can change by having a new port added which changes previously defined switch zones.

In the third step 503, changes to the sets are notified to the software agent which controls the association of sets with logical units. This notification can be by some form of exception handling or by a directory service. For example, Fibre Channel SANs use a Registered State Change Notification (RSCN) to keep storage devices in step with changes in switch configurations so that events that result in a change in configuration trigger a re-discovery of the port identifiers in a switch zone.

In the fourth step 504, the software agent extracts the new port identification information from the source of the set.

In the fifth step 505, the associations in the software agent are changed to reflect the changes to the set.

The described method and apparatus remove the need for inputting identifiers for individual ports into a storage controller. Grouping of ports that require access to the same logical units in sets and associating the sets with the selected logical units provides an intermediate grouping that can change without having to manually update each relationship between a port and a logical unit. This provides several advantages over existing methods as given below.

Configuration changes such as host bus adapter replacements can be carried out without requiring mappings to be deleted and re-applied. The new port identifiers in the form of WWPNs/WWNNs are automatically acquired when the physical connection is changed.

The association of the logical unit numbers to the sets is much simpler than mapping multiple port identifiers to logical unit numbers and is therefore less prone to error.

Adding a new port to a SAN only requires a change to the switch zoning which would be required anyway. The new port would automatically be set up with the same associations as the other ports in the same zone. Specific logical unit mapping set up is not required on storage controller for the new port.

Logical units can easily be temporarily mapped to a specific port for a short period by adding the port to an existing zone, for example, to a tape backup, or remote site SAN. This reduces overheads and security risks.

Another advantage is that SAN storage resources can be better utilised as mapping relationships do not need to be kept in memory.

SAN storage appliances that are central to the reliability and service capabilities of a SAN will know when a connection to a host changes and can keep logs of such events and raise error conditions to the user.

Logical association of hosts running applications that require access to a specific set of logical units is possible without lots of levels of re-direction and configuration.

The present invention is typically implemented as a computer program product, comprising a set of program instructions for controlling a computer or a similar device such as a storage controller. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

The invention claimed is:

1. An apparatus to control access to logical units, where a plurality of logical units are accessible via a network by at least one port, comprising:
   a definition unit to define a set so as to comprise at least one port that requires access to certain logical units, the set having a name and being a named set; and
   an association unit operable to associate the named set with the certain logical units to enable a determination of identification information for the at least one port by referencing the name;
   where a storage controller operates as a back-up storage controller by associating all ports of the storage controller in all named sets and by selecting which named set that the logical units of the storage controller are associated with; and where
   said association unit that is operable to associate the named set with the certain logical units comprises part of a first storage controller, where said storage controller that operates as a back-up storage controller comprises a second storage controller.

2. The apparatus as in claim 1, where a logical unit comprises an addressable entity that accepts commands and a port comprises an addressable entity that sends commands.

3. The apparatus as in claim 1, where the certain logical units comprise a part of a storage device accessed via a storage area network.

4. The apparatus as in claim 3, where the storage area network uses a SCSI protocol.

5. The apparatus as in claim 3, where the storage area network comprises a Fibre Channel interface.

6. The apparatus as in claim 1, where said definition unit comprises means for coupling together a plurality of ports that are members of the set and providing a locating address for the set.

7. The apparatus as in claim 1, where said definition unit is operable to logically identify those ports that are members of the set using port identification information.

8. The apparatus as in claim 1, where said definition unit is at a first location, and where said association unit is at a second location.

9. The apparatus as in claim 1, where identification information is changeable in response to changes in port configurations.

10. The apparatus as in claim 1, where logical units are identified by logical unit numbers.

11. The apparatus as in claim 1, where logical units of said second storage controller are operated as temporary storage, and where a relationship of logical units to storage area network switch zones of the second storage controller is modified such that data storage represented by the second storage controller is used by a host computer running an application that requires temporary storage.

12. A method to control access to logical units, wherein a plurality of logical units are accessible via a network by at least one port, comprising:
   defining a set to comprise at least one port that requires access to certain logical units, the set having a name and being a named set;
   associating the named set with the certain logical units; and
   extracting identification information for the at least one port by referencing the name;
   where an association unit that performs the associating of the named set with the certain logical units comprises part of a first storage controller, and where a second storage controller operates as a backup storage controller by associating all ports of the second storage controller in all named sets and by selecting which named set that the logical units of the second storage controller are associated with.

13. The method of claim 12, where a logical unit comprises an addressable entity that accepts commands and is identified by a logical unit number, and a port comprises an addressable entity that sends commands.

14. The method of claim 12, where the certain logical units comprise a part of a storage device accessed via a storage area network.

15. The method as in claim 14, where the storage area network uses a SCSI protocol.

16. The method as in claim 14, where the storage area network comprises a Fibre Channel interface.

17. The method of claim 12, where defining comprises coupling together a plurality of ports that are members of the set; and providing a locating address for the set.

18. The method of claim 12, where defining comprises logically identifying those ports that are members of the set.

19. The method of claim 12, further comprising changing identification information in response to changes in port configurations.

20. A non-transitory computer readable storage medium comprising computer readable program code for controlling access to logical units, wherein a plurality of logical units are accessible via a network by at least one port, execution of the computer program product by at least one computer providing operations that comprise:

> defining a named set to comprise identification information of ports that require access to certain logical units, where each port comprises an addressable entity that sends commands, where each logical unit comprises an addressable entity that accepts commands and where at least some logical units comprise a part of a storage device accessed via a storage area network;
>
> changing identification information in response to changes in port configurations; and
>
> associating the named set with the certain logical units to enable a determination of identification information for at least one port by referencing the name of the set;
>
> where an association unit that performs the associating of the named set with the certain logical units comprises part of a first storage controller, and where a second storage controller operates as a backup storage controller by associating all ports of the second storage controller in all named sets and by selecting which named set that the logical units of the second storage controller are associated with.

21. The non-transitory computer readable medium as in claim 20, where the operation of defining comprises coupling together a plurality of ports that are members of the set and providing a locating address for the set.

22. The non-transitory computer readable medium as in claim 20, where the operation of defining comprises physically coupling together a plurality of ports that are members of the set and providing a locating address for the set.

23. The non-transitory computer readable medium as in claim 20, where the storage area network uses a SCSI protocol.

24. The non-transitory computer readable medium as in claim 20, where the storage area network comprises a Fibre Channel interface.

25. The non-transitory computer readable medium as in claim 20, where the operation of defining comprises logically identifying those ports that are members of the set.

26. The non-transitory computer readable medium as in claim 20, where the operation of associating occurs at a plurality of locations.

27. The non-transitory computer readable medium as in claim 20, where logical units are identified by logical unit numbers.

28. The non-transitory computer readable medium as in claim 20, executed at least in part in a system comprising means for defining the named set to comprise identification information of the group of ports that require access to certain logical units, and means for changing the identification information in response to changes in port configurations enabling a determination of identification information for at least one port by referencing the name of the set.

29. The non-transitory computer readable medium as in claim 28, where a given one of a group of ports is one of a physical group of ports or a logical group of ports.

* * * * *